United States Patent [19]

Kennedy et al.

[11] 3,901,554
[45] Aug. 26, 1975

[54] SPOKE MOUNTABLE DISPLAY DEVICE

[75] Inventors: James D. Kennedy, Streamwood; J. Henry Lindner, Wood Dale, both of Ill.

[73] Assignee: Elgin Molded Plastics Co., Elgin, Ill.

[22] Filed: Apr. 8, 1974

[21] Appl. No.: 459,023

[52] U.S. Cl. .......................... 301/37 SA; 40/129 B
[51] Int. Cl. .............................................. B60b 7/00
[58] Field of Search... 301/37 SA; 40/129 R, 129 B, 40/129 C

[56] References Cited
UNITED STATES PATENTS
2,344,542  3/1944  Fike .............................. 301/37 SA

*Primary Examiner*—M. Henson Wood, Jr.
*Assistant Examiner*—D. W. Keen
*Attorney, Agent, or Firm*—Hill, Gross, Simpson, Van Santen, Steadman, Chiara & Simpson

[57] ABSTRACT

A display device for mounting either through flattened bodies or over spokes of a spoked vehicle wheel between hub and rim portions thereof. The device includes a display panel and a bracket assembly. The bracket assembly incorporates a longitudinally slotted pin means with integral exterior ridges. The pin slidably engages and locks in a snap type fit within a cap means. The space between the pin's head and the cap's end longitudinally along the pin may be occupied by the width of a spoke member which extends transversely through the pin slot and by the thickness of a display panel through which the pin extends. In one form, tension between rivet like means and cap like means is adjustable about a spoke member.

5 Claims, 12 Drawing Figures

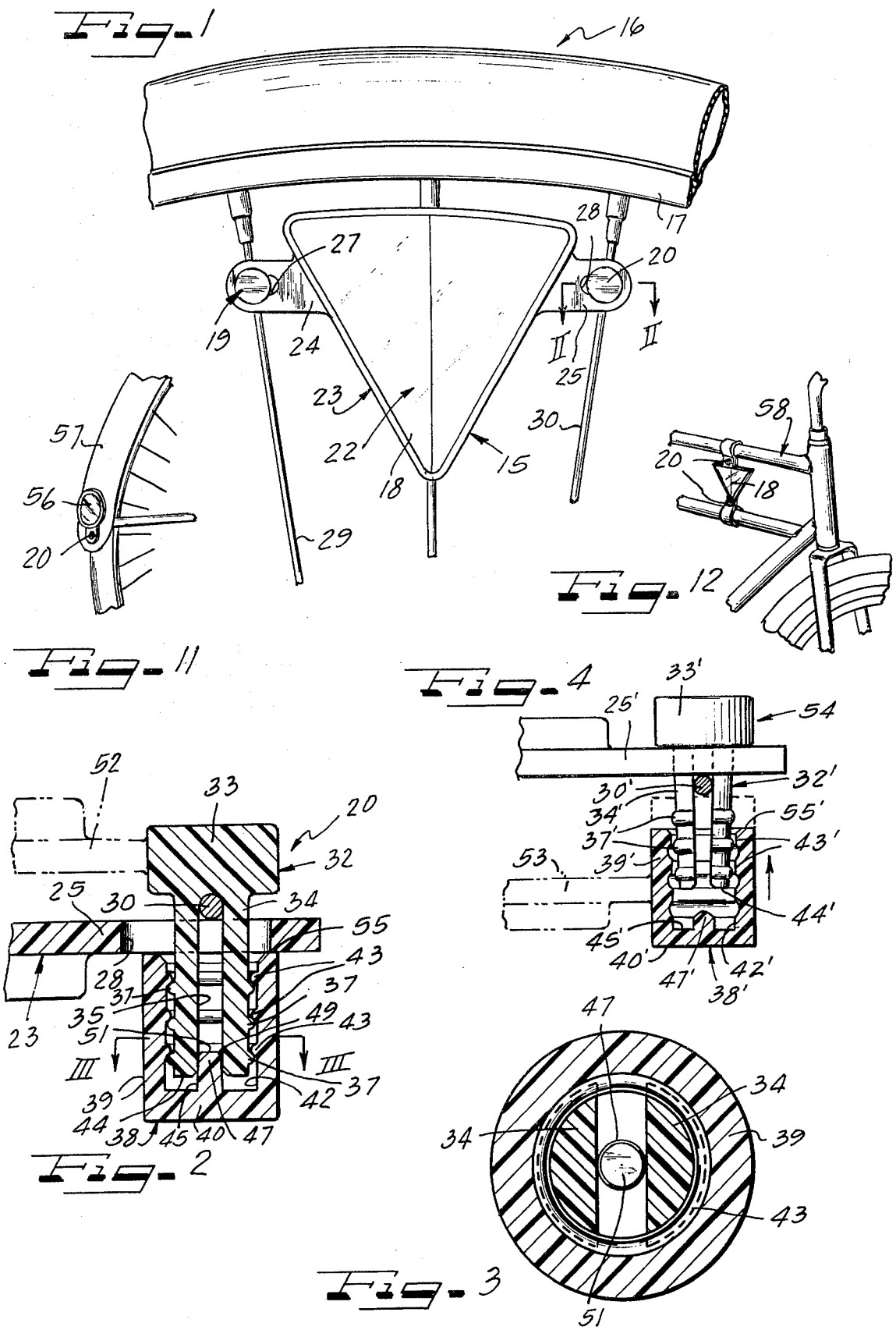

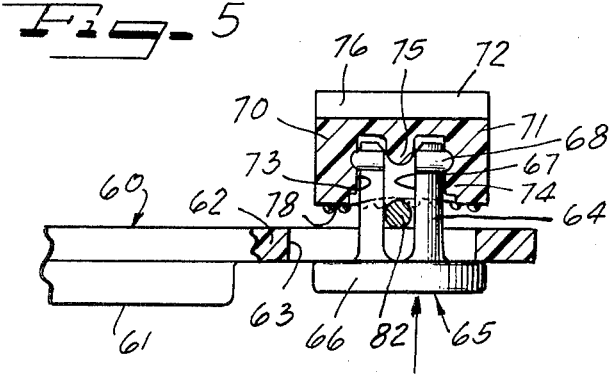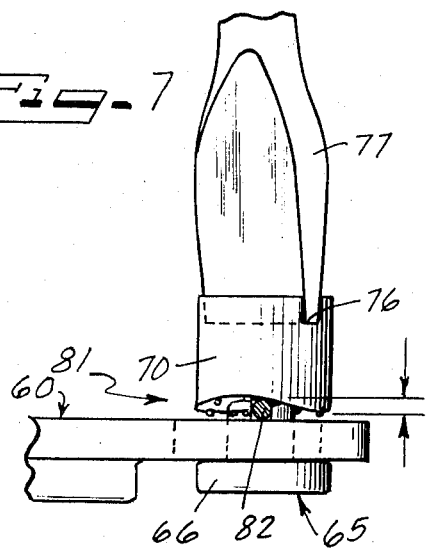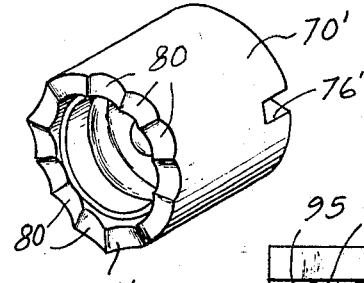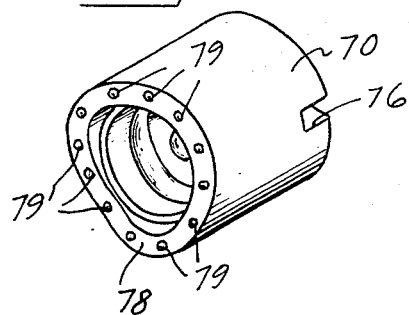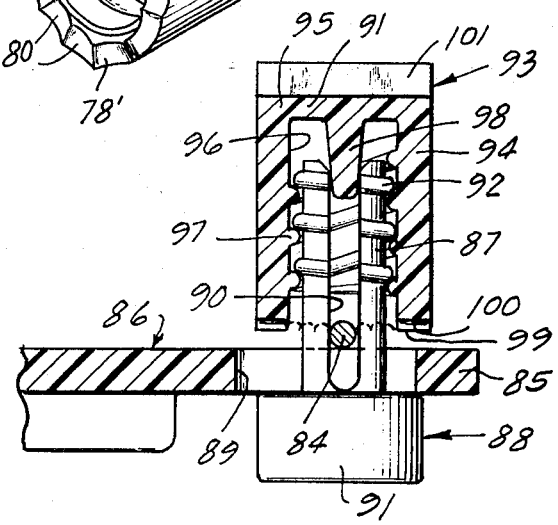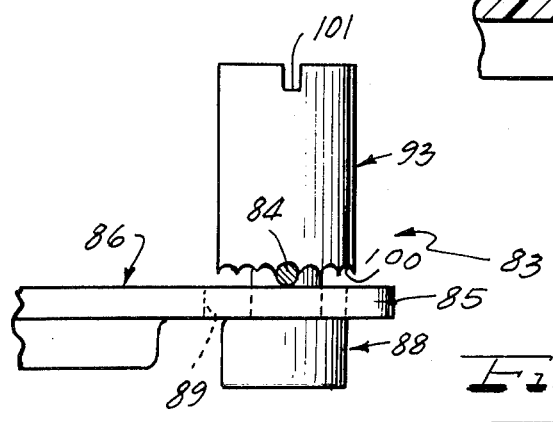

3,901,554

SPOKE MOUNTABLE DISPLAY DEVICE

BACKGROUND OF THE INVENTION

Wheel spoke, or panel mountable, display devices, especially reflectors, vehicular licenses, and the like, have heretofore been known, but most of such devices require rather elaborate means for so mounting, including especially a variety of small parts which are easily lost or broken, or even improperly assembled, especially by an inexperienced person. Screw, nut and washer assemblies are especially common. Such prior art devices generally suffer from other serious disadvantages, among which are spoke or panel damage or distortion, excessive weight, cumbersomeness, unattractiveness, tendency to loosen in use, suitability for only a single application situation, high cost, fragility, etc.

Display devices having simple, snap-fit bracket assemblies formed of plastic have been very slow to appear in the art, as have bracket assemblies adapted for installation of display panels on any one of a wide variety of support means, such as spokes, panels, thin bars, and the like. The need in the art for display devices coacting with such bracket assemblies is very great owing to a rapid increase in the desire in the art for reflector assemblies, vehicular licenses, signs, and the like which are mountable in some desired location using simple components having few parts for inventory and manufacturing purposes, having easy assembly for low labor costs, and having durability for reliability and long life.

BRIEF SUMMARY OF THE INVENTION

The present invention is directed to an improved display device having features such as just indicated. There is provided a simple, economical, durable bracket assembly which coacts with a display panel. The display device is adapted for mounting in a wide variety of locations including the spokes of a cycle wheel.

A single such bracket assembly with a given display panel can be sufficient to achieve a desired mounting of such composite display device, but two or even three such bracket assemblies may be employed with a single display panel if desired.

The display device is characteristically of durable construction and may be readily fabricated from inexpensive materials using conventional procedures known to the art.

In one form, such a display device is adapted for virtually universal mounting upon, about, or through many different types, sizes, and styles of support members, particularly sheet members and spoke members such as are found on cycle type vehicles.

The present invention provides display devices which overcome many prior art mounting disadvantages and have many novel and useful features, utilities, and end use applications, as indicated above.

Other and further objects, purposes, advantages, utilities, aims, and features will be apparent to those skilled in the art from a reading of the present specification and drawings.

BRIEF DESCRIPTION OF THE DRAWINGS

FIG. 1 is a fragmentary view in side elevation of a bicycle wheel which has an embodiment of a display device of this invention (here a reflector) mounted on the spokes thereof;

FIG. 2 is a fragmentary sectional view taken along the line II—II of FIG. 1 longitudinally through a bracket assembly, the engaged spoke member involved being shown in transverse section;

FIG. 3 is a sectional view taken along the line III—III of FIG. 2 transversely through the bracket assembly;

FIG. 4 shows a view similar to FIG. 2 but showing an alternative embodiment of a bracket assembly in partial assembly;

FIG. 5 is a view similar to FIG. 2 but showing another alternative embodiment of an assembled bracket assembly;

FIG. 6 is an isometric view of a cap means employed in the bracket assembly shown in FIG. 5;

FIG. 7 is a top plan view of the embodiment shown in FIG. 5 with the engaged spoke member being shown in transverse section illustrating the longitudinal adjustability associated with such bracket assembly;

FIG. 8 is a view similar to FIG. 6 but showing an alternative embodiment of a cap means;

FIG. 9 is a view similar to FIG. 2 but showing another alternative embodiment of an assembled bracket assembly;

FIG. 10 is a top plan view of the bracket assembly shown in FIG. 9 with the engaged spoke member being shown in transverse section;

FIG. 11 is a perspective view of another embodiment of a display device of this invention mounted upon a bicycle frame member; and FIG. 12 is a perspective view of another embodiment of a display device of this invention mounted upon a bicycle frame.

DETAILED DESCRIPTION

Referring to FIGS. 1 through 3, there is seen one embodiment of a display device of this invention herein designated in its entirety by the numeral 15. Device 15 is shown in an assembled, mounted configuration upon a spoked vehicle wheel 16 adjacent the rim portions 17 thereof. Device 15 incorporates a display panel 18 and a pair of bracket assemblies 19 and 20.

The display panel 18 is a reflector which incorporates a central portion 22 which is a clear plastic flattened member having a smooth outer face and an inner face which has molded thereto a plurality of facets (not shown) which are adapted to retro-reflect incident light in some predetermined manner, as those skilled in the art will appreciate. The construction of a central portion 22 is known to the art and does not constitute a point of novelty in the present invention. The central portion 22 is mounted in a peripheral frame member 23. Frame member 23 here includes integrally therewith a pair of flattened body portions 24 and 25 which extend laterally outwardly from the (here triangular) sides of frame member 23 in opposed relationship to each other. Each flattened body member 24 and 25 has an aperture 27 and 28, respectively, transversely defined therein. Location of members 24 and 25, and respective apertures 27 and 28, relative to a frame 23 is a matter of choice. Each of the apertures 27 and 28 is here elongated so as to permit some adjustability in aligning the individual apertures 27 and 28 with spoke members 29 and 30, respectively, of spoked vehicle wheel 16. The frame member 23 can have a continuous back (not shown) which is recessed relative to the peripheral portions thereof so that the central portion 22 can be inset into such peripheral portions 23, as those skilled in the art will appreciate.

Each of the bracket assemblies 19 and 20 is similarly constructed. The structure of assembly 20 may be taken as representative and as illustrative for present purposes; see FIGS. 2 and 3. Thus, the bracket assembly 20 comprises a pin 32 having a head 33 and a shank 34 which is provided with a longitudinal slot 35. Shank 34 is of generally uniform cross-sectional configuration (here peripherally circular) and the slot 35 transverses the central axis of shank 34.

The shank 34 has a plurality of circumferentially extending, radially outwardly projecting ridges 37 integrally formed therewith. Pin 32 is conveniently formed of rigid but deformable material using, for example, a thermoplastic, such as a nylon, a polyester, a polyamide, or other polymeric material, or the like.

The bracket assembly 20 further has a cap 38. Cap 38 has a sleeve portion 39 and a head portion 40 extending generally across one end of sleeve portion 39 and integrally formed therewith. The inside wall 42 of sleeve portion 39 has dimensions generally suited to permit the cap 38 to slidably engage circumferentially the outer walls of shank 34. Inside wall 42 has a plurality of circumferentially extending, radially inwardly protruding raised portions 43 which are integrally formed therewith. The cap 38 is conveniently formed of rigid but deformable material, such as a molded thermoplastic material of the type used to form the pin 32, as indicated above, for example.

The interrelationship between pin 32 and cap 38 is such that, when the pin 32 and the cap 38 are fully inter-engaged slidably in the assembled configuration illustrated, for example in FIG. 2, the forward end 44 of shank 34 is in adjacent but spaced relationship to the inside wall 45 of head portion 40 of cap 38. Also, in the assembled configuration shown in FIG. 2, the ridges 37 are matingly received in locking engagement adjacent the raised portions 43, and the pin 32 and the cap 38 are restrained from disengagement. When the cap 38 and the pin 32 are being inter-engaged slidably, the shank 34 is radially inwardly compressed as the ridges 37 thereof are slidably moved over the raised portions 43 of cap 38.

In display device 15 as mounted on the spoked wheel member 16, the spokes 29 and 30 extend transversely through the slotted shank of the respective pins in assemblies 19 and 20. Thus, for example, spoke 30 extends through slot 35 of shank 34 and rests at the base of shank 34 adjacent head 33 of pin 32. Shank 34 extends through aperture 28 so that flattened body member 25 rests against spoke 30. Spoke 30 and flattened body member 25 are maintained in this configuration when the cap 38 is mounted over the pin 32 as described above.

In display device 15, each of the bracket assemblies 19 and 20 is preferably (as shown in FIGS. 1 through 3) provided with an added feature. Thus, referring to assembly 20, each head portion 40 on its inside wall 45 is provided with an integral stem member 47 which axially (relative to cap 38) inwardly projects into the interior space circumscribed by the sleeve portion 39. The cross-sectional dimensions of stem member 47 are chosen so as to approximate the normal interior dimensions of slot 36, particularly in the end region thereof adjacent the forward end 44 of shank 34. The stem member 47 serves to slidably engage the slot 35 during assembly of pin 32 and cap 38 so that the portions of shank 34 on either side of slot 35 are retained in a radially outwardly relatively fixed position by the stem member 47 so as to enhance the locking action between the ridges 37 and the raised portions 43 in an assembled bracket assembly 20. To facilitate engagement of stem member 47 with the forward end 44 of the shank 34, a taper 48 on the inside edge portions of forward end 44 adjacent the slot 35 is preferably provided. Similarly, a taper 49 may be provided on the peripheral edge portions of the forward end 51 of stem member 47. In the embodiment shown, the stem member 47 is circular in cross-section, but it will be appreciated that many cross-sectional configurations may be employed for a given stem member 47.

While in display device 15 the display panel 18 is separate from the respective bracket assemblies 19 and 20, those skilled in the art will appreciate that the head of pin 32 or the cap 38 may be integrally formed with, for example, flattened body members 24 and 25. For example, the dotted line 52 in FIG. 2 illustrate, one manner in which a flattened body member 25 can be integrally formed with the head 33 of pin 32, while in FIG. 4 the flattened body member 25' may be connected with cap 38' as shown by dotted lines 53.

In FIG. 4 is shown a view similar to FIG. 2 of an alternative form of bracket assembly, such alternative bracket assembly form being herein designated in its entirety by the numeral 54. The component elements of the bracket assembly 54 are similar to those of the bracket assembly 20 and are similarly numbered but with the addition of prime marks thereto. In the bracket assembly 54 the shank 34' is formed so as to have its outer circumferential wall portions gradually tapered proceeding from head 33' to forward end 44'. The purpose of this taper is to facilitate the engagement of pin 32' with cap 38'. In the fully assembled configuration, the stem member 47' expands portions of the shank 34' adjacent the forward end 44' radially outwardly to enhance interlocking action as earlier described in reference to the bracket assembly 20. Observe that in the cap 38' the raised portions 43' have a different configuration from the raised portions 43 of bracket assembly 20. Also observe that, in FIG. 4, the flattened body member 25' is so positioned on the shank 34' as to be adjacent the head 33' and the spoke 30' is positioned between the flattened body member 25 and the end 55' of sleeve portion 39' of cap 38. In both the bracket assemblies 20 and 54, the interrelationship between the length of shanks 34 and 34', the longitudinal width of sleeve portions 39 and 39', and the thickness of the adjacent regions in flattened body member 25 next to aperture 28, is such that, when the bracket assemblies 20 and 54' and the display panel 18 are in fully assemblied configuration with a support member (here spoke 30 or 30') therebetween, the length of the shank 34 or 34' between the head 33 or 33' of pin 32 or 32' and the opened end 55 or 55' of sleeve portions 39 or 39' when the cap 38 or 38' and the pin 32 or 32' are so fully slidably engaged is about equal to the thickness of the support member (here the spoke 30 or 30') and the thickness of the flattened body member 25, as the case may be.

Those skilled in the art will appreciate that each of the bracket assemblies 20 and 54 is adapted for mounting through an aperture in a support member (not shown) in place of mounting about a spoke 30 or 30'.

Thus, the bracket assembly 20 can be adapted for mounting a display panel 56 upon, for example, a bicycle rear fender member 57 as shown in FIG. 11. Alternatively, for example, the bracket assembly 20 may be used to mount a pair of matingly engaging display panels 18 about frame members of a bicycle frame 58, as illustrated, for example, in FIG. 12. A bracket assembly of the type used in a display device of the present invention may be readily fabricated in a form which particularly well adapts a bracket assembly for use with a particular support member upon which a display device of this invention is to be mounted. For example, referring to FIG. 5, there is seen a display device 60 comprised of a display panel 61 which is equipped with a flattened body member 62 having an aperture 63 formed therein. Through aperture 63 is extended the shank 64 of a pin 65 having a head 66. Shank 64 is equipped with a slot 67 and has a generally uniform cross-sectional configuration. The shank 64 has one circumferentially extending, radially outwardly projecting ridge 68. The pin 65 is formed of rigid but deformable material in the manner, for example, of pin 32.

Engaged with pin 65 is a cap 70 which has a sleeve portion 71 and a head portion 72 extending generally across one end of the sleeve portion 71 and integral therewith. The inside wall 73 of sleeve portion 71 has dimensions generally suited to slidably engage circumferentially the outer walls of the shank 64. The inside wall 73 has a circumferentially extending radially inwardly protruding raised portion 74 which is integral therewith. The cap 70 is formed of rigid but deformable material in the manner of the cap 38. The cap 70 is equipped with a stem member 75 adapted to function in the manner of stem 47 in relation to shank 64. The cap 70 is further characterized by having its head portion 72 provided with a transversely extending slot 76 which is adapted for receipt of the head of a screw driver such as screw driver 77 therein. The forward end 78 of sleeve portion 71 is non-planar and has a curved profile as illustrated for example, in the FIG. 6. Preferably, such forward end is bilaterally symmetrical so that opposite sides of the forward end 78 are generally transversely alignable, as illustrated for example, in FIG. 7. Integrally formed on forward end 78 are a plurality of circumferentially spaced, systematic variations in the general contour of the embodiment of the cap 70 shown, for example, in FIG. 6. These variations are provided by the plurality of circumferentially spaced, raised projections 79. In the alternative form of cap 70, illustrated as cap 70' in FIG. 8, the forward end 78' is provided with a series of concave, arcuate indentations 80, which are superimposed upon the general contour of the forward end 78'. When a bracket assembly 81 comprised of cap 70 (or 70') and pin 65 is in the assembled configuration illustrated in FIGS. 5 and 7 with the shank 64 having extended therethrough a bicycle spoke 82 and the shank 64 further projecting through the aperture 63 of flattened body member 62, the forward end 78 of cap 70 (or the forward end 78' of cap 70') lodges against circumferential portions of the spoke 82. The spoke 82 may be compressed against the flattened body member 62 by forward end 78 to an extent consistent with the respective interrelated dimensions of the various components involved by inserting a screw driver 77 into the slot 76 and turning the cap 70 so that, the cap 70 is rotatable to a position about the axis of the shank 64 where the spoke 82 is firmly abutting against the surface of flattened body member 62 with the spoke 82 simultaneously being compressed against the inside forward wall 78 of cap 70 and with the flattened body member 62 being compressed against the head 66 of pin 65 in regions adjacent the aperture 63.

The arrangement shown in FIGS. 5, 6, and 7, and as further illustrated by alternative cap member 70' shown in FIG. 8, is particularly advantageous where a display device 60 is to be mounted upon a bicycle wheel member because of the tendency through use for most bracket assemblies to loosen and permit an associated display panel to move or vibrate (rattle). In this way, the adjustability feature associated especially with the cap 70 (or cap 70') permits the bracket assembly 81 to be adjusted for optimum performance standards in a given display device 60.

A further alternative embodiment of a bracket assembly, here designated in its entirety by the number 83, is illustrated in FIGS. 9 and 10. This bracket assembly 83, like bracket assembly 81, is provided with an adjustability feature whereby the bracket assembly 83 may be tensioned against a spoke member 84 and a flattened body member 85 (of a display panel 86) duly mounted therebetween with the bracket assembly 83 in an assembled configuration with respect thereto, the shank 87 of pin 88 duly extending through an aperture 89 in flattened body member 85 and having the spoke 84 transversely positioned through the slot 90 of shank 87. The pin 88 is equipped with a head 91 which abuts matingly against flattened body member 85 in regions thereof adjacent aperture 89 therein. Pin 88 is equipped with spirally extending, radially outwardly projecting ridge members 92.

Cap 93 having a sleeve portion 94 and a head portion 95 integral therewith is formed so that the inside wall 96 of sleeve portion 94 is provided with a spirally or helically extending, radially inwardly projecting raised portion 97 which is integral therewith. The reaised portions 97 are adapted to threadably engage and mate with the ridge members 92 of pin 88. The cap 93 is provided with a stem member 98 axially inwardly projecting from head portion 95 into sleeve portion 94. The stem member 98 is dimensioned so as to permit the stem member 98 to slidably engage and project into the slot 90 when the pin 88 and the cap 93 are assembled. The forward end 99 of sleeve 94 circumferentially extends in a normal manner cross-sectionally across sleeve portion 94. In addition, the forward end 99 is provided with a plurality of concavely arranged arcuate indentations 100 in a manner similar to the indentations 80 of cap 70'.

Alternatively, (not shown) the forward end 99 could be provided with projections 79, as shown for cap 70 in FIG. 6. By revolving cap 93 about its axis when the cap 93 and the pin 88 are assembled as shown, for example, in FIGS. 9 and 10, (by using, for example, a screw driver, such as screw driver 77, inserted into a slot 101 formed transversely across the head 91), the cap 93 can be moved into a position where a desired degree of tension is achieved between a spoke member 84 and the forward end 99, the spoke 84 otherwise being in contact with the flattened body member 85 and the flattened body member 85 being in contact with head 91.

Other and further embodiments and variations of the present invention will become apparent to those skilled in the art from a reading of the present specification taken together with the drawings and no undue limitations are to be inferred or implied from the present disclosure.

We claim:

1. A display device for mounting over spokes of a spoked vehicle wheel comprising a bracket assembly and a display panel,
   A. said bracket assembly comprising
      1. a pin means having a longitudinally slotted shank of generally uniform cross-sectional configuration, said shank having at least one circumferentially extending radially outwardly projecting ridge means integral therewith, said pin means being formed of rigid but deformable material,
      2. a cap-like means having a sleeve portion and a head portion extending generally across one end of said sleeve portion and integral therewith, the inside wall of said sleeve portion having dimensions generally suited to slidably engage circumferentially said shank, said inside wall having at least one circumferentially extending, radially inwardly protruding raised portion integral therewith, said cap-like means being formed of rigid but deformable material,
      3. the interrelationship between said pin means and said cap-like means being such that, when said respective means are fully interengaged slidably, in an assembled configuration, the forward end of said shank is in adjacent but spaced relationship to the inside wall of said head portion, said ridge means is matingly received in locking engagement adjacent said raised portions, and said pin means and said cap-like means are restrained from disengagement, said shank being radially inwardly compressed as said ridge means thereof is slidably moved over said raised portions of said cap-like means during such slidable engagement,
   B. said display panel having
      1. a portion which is adapted for display, and
      2. a flattened body portion generally integral with said display portion, said body portion having an aperture transversely defined therein whose size permits said slotted shank to extend therethrough and further permits the head of said pin means to abut against aperture adjacent regions of said flattened body portion when in assembled configuration,
   C. the interrelationship between the length of said shank, the longitudinal width of said sleeve portion, and the thickness of said adjacent regions of said flattened body member being such that, when said bracket assembly and said display panel are in assembled configuration with a support member therebetween, the length of said shank between said head of said pin means and the open end of said sleeve portion when said cap-like means and said pin means are so fully slidably engaged is about equal to the thickness of said support member and the thickness of said adjacent regions of said flattened body member.

2. The device of claim 1 wherein said cap-like means has its said head portion provided with an integral stem member which, axially relative to said cap-like means inwardly projects into the interior space circumscribed by said sleeve portion of said cap-like means, the dimensions of said stem member being adapted to slidably engage said shank in said slot thereof and to retain the circumferential outer walls of said shank adjacent the forward end thereof in relatively fixed position adjacent inner walls of said sleeve portion.

3. The device of claim 2 wherein said pin means has a single such ridge means and said cap-like means has a single such raised portion.

4. The device of claim 2 wherein said pin means has a plurality of such raised portions and said cap-like means has a plurality of such raised portions.

5. The device of claim 2 wherein said pin means has ridge means which spirally extends and said cap-like means has a raised portion which analogously spirally extends.

* * * * *